Dec. 19, 1967 L. A. ULE 3,358,944

HELIOTROPIC DEVICE FOR ORIENTING A SPACE VEHICLE

Filed Aug. 27, 1962 4 Sheets-Sheet 1

INVENTOR.
LOUIS A. ULE
BY
ATTORNEY

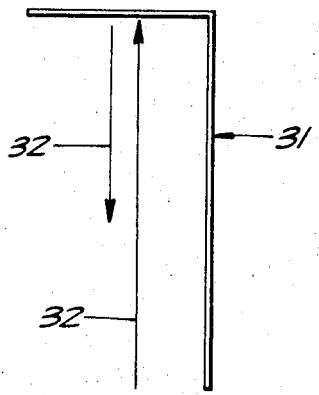
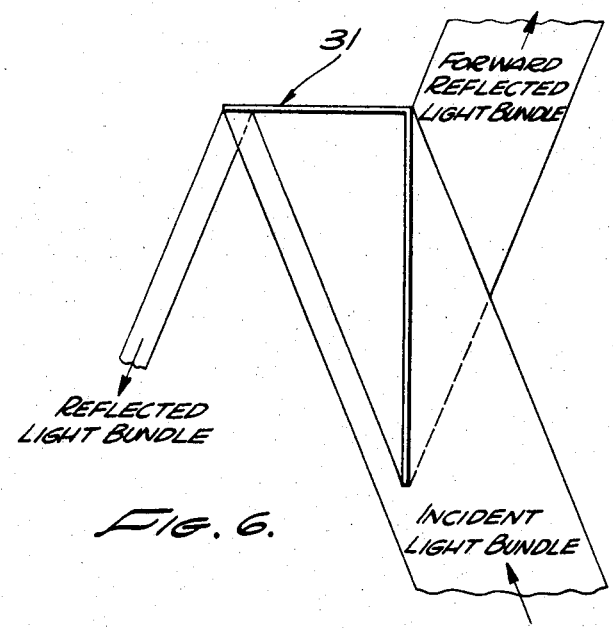
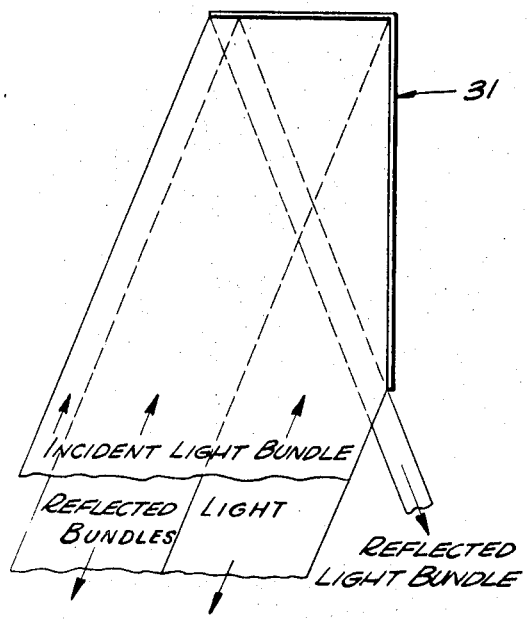
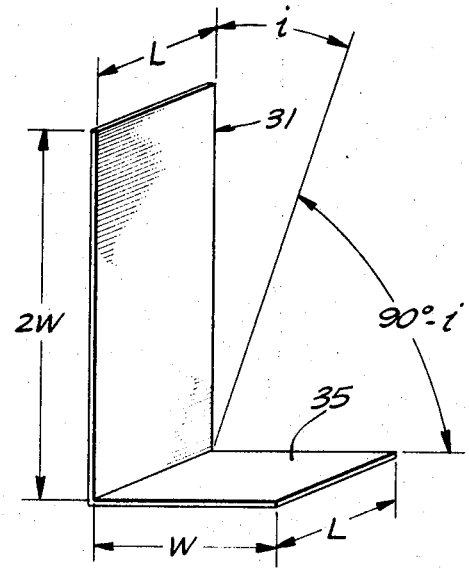
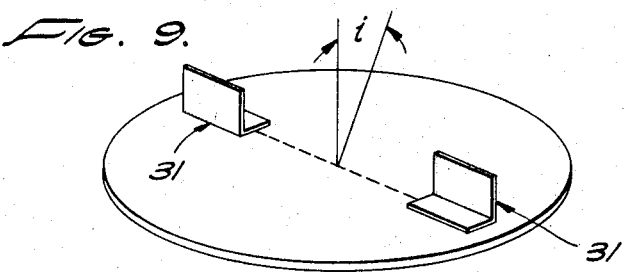

Dec. 19, 1967     L. A. ULE     3,358,944
HELIOTROPIC DEVICE FOR ORIENTING A SPACE VEHICLE
Filed Aug. 27, 1962     4 Sheets-Sheet 3

INVENTOR.
LOUIS A. ULE
BY *M. Jabin*
ATTORNEY

Dec. 19, 1967  L. A. ULE  3,358,944
HELIOTROPIC DEVICE FOR ORIENTING A SPACE VEHICLE
Filed Aug. 27, 1962  4 Sheets-Sheet 4

INVENTOR.
LOUIS A. ULE
BY
ATTORNEY

United States Patent Office 3,358,944
Patented Dec. 19, 1967

3,358,944
HELIOTROPIC DEVICE FOR ORIENTING
A SPACE VEHICLE
Louis A. Ule, Rolling Hills, Calif., assignor, by mesne assignments, to Globe-Union Inc., Milwaukee, Wis., a corporation of Delaware
Filed Aug. 27, 1962, Ser. No. 219,422
4 Claims. (Cl. 244—1)

The present invention relates to positive heliotropic devices and, more particularly, to such devices which can be used to orient converters which transform solar energy into electrical, chemical, mechanical, or thermal energy.

Energy converters have been devised and produced which transform solar energy into various other types of energy. In recent years, silicon photovoltaic converters, sometimes called "solar cells," have become attractive as means for converting solar energy into electrical energy. In order to derive maximum power from a converter panel, it is necessary that the cells making up the panel be positioned in such a manner that they face the sun directly. The need is apparent for a lightweight, inexpensive device which will track the sun and constantly keep a solar-energy converter panel oriented so that the sun's rays strike the panel with normal incidence.

Therefore, one of the objects of the present invention is to provide an inexpensive, light and reliable device which will track the sun and thus keep the associated solar-energy converter panel oriented in such a manner that the sun's rays strike the panel with normal incidence.

Another object of this invention is to provide a device of the type described which operates under its own power and is not dependent on any internal source of power such as a battery, generator, or a portion of the energy converted by the solar energy converters.

According to one embodiment of the present invention, light pressure is used to correct the attitude of a misoriented space vehicle, by applying a torque thereto. The heliotropic apparatus can be any optically refracting, reflecting, diffracting or absorbing device that exhibits optical asymmetry, which term as used herein means any device having the property such that the magnitude of the force produced thereon by light pressure is dependent upon the angle of incidence of the impinging light, with respect to the surface on which it impinges. Preferably, all the exposed surfaces of the device should exhibit the same optical characteristics.

The term "space vehicle," as used herein, means any device operating outside the earth's atmosphere, such as earth satellites, lunar probes, interplanetary probes, solar-energy collectors, and space craft.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURES 5, 6, and 7 show light falling upon an L-shaped mirror at normal incidence, outside the corner, and inside the corner, respectively.

FIGURE 8 is an isometric view of an L-shaped mirror.

FIGURE 9 shows a pair of L-shaped mirrors on a circular supporting structure.

Figure 10:
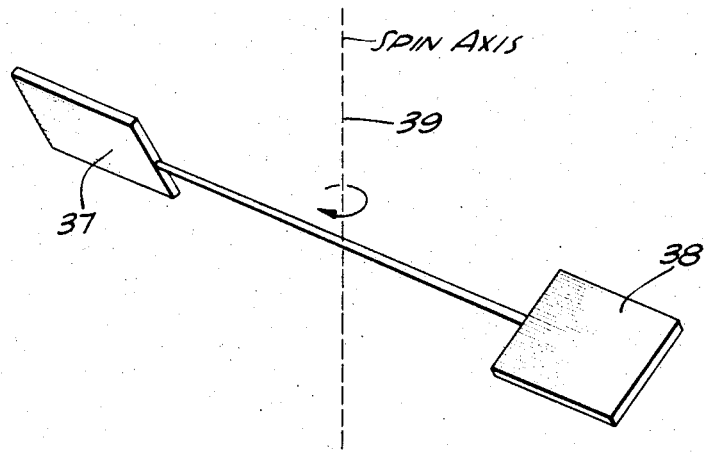

FIGURE 10 is an isometric view of a different embodiment of the present invention.

Figure 11:
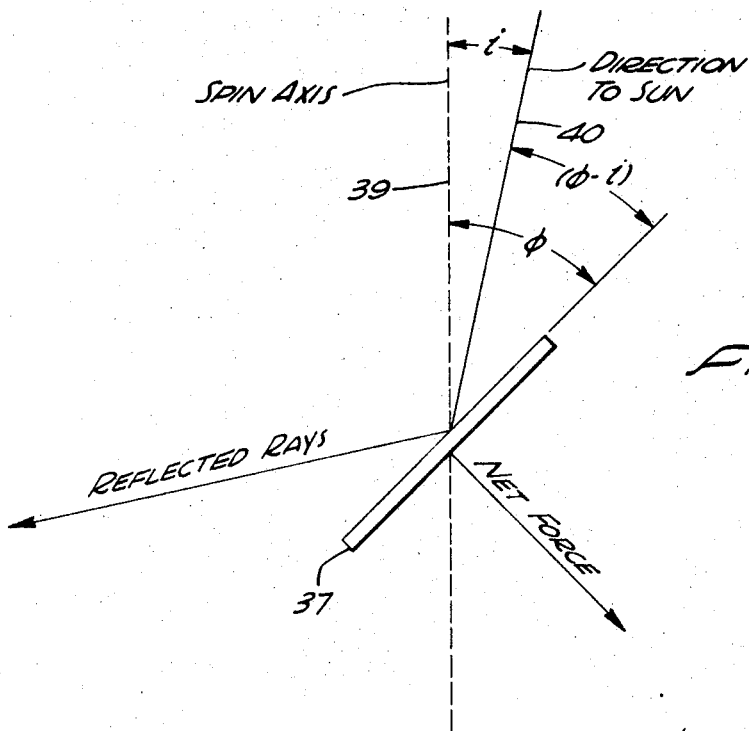

FIGURE 11 is a side view of one of the reflectors of FIGURE 10.

Figure 12:
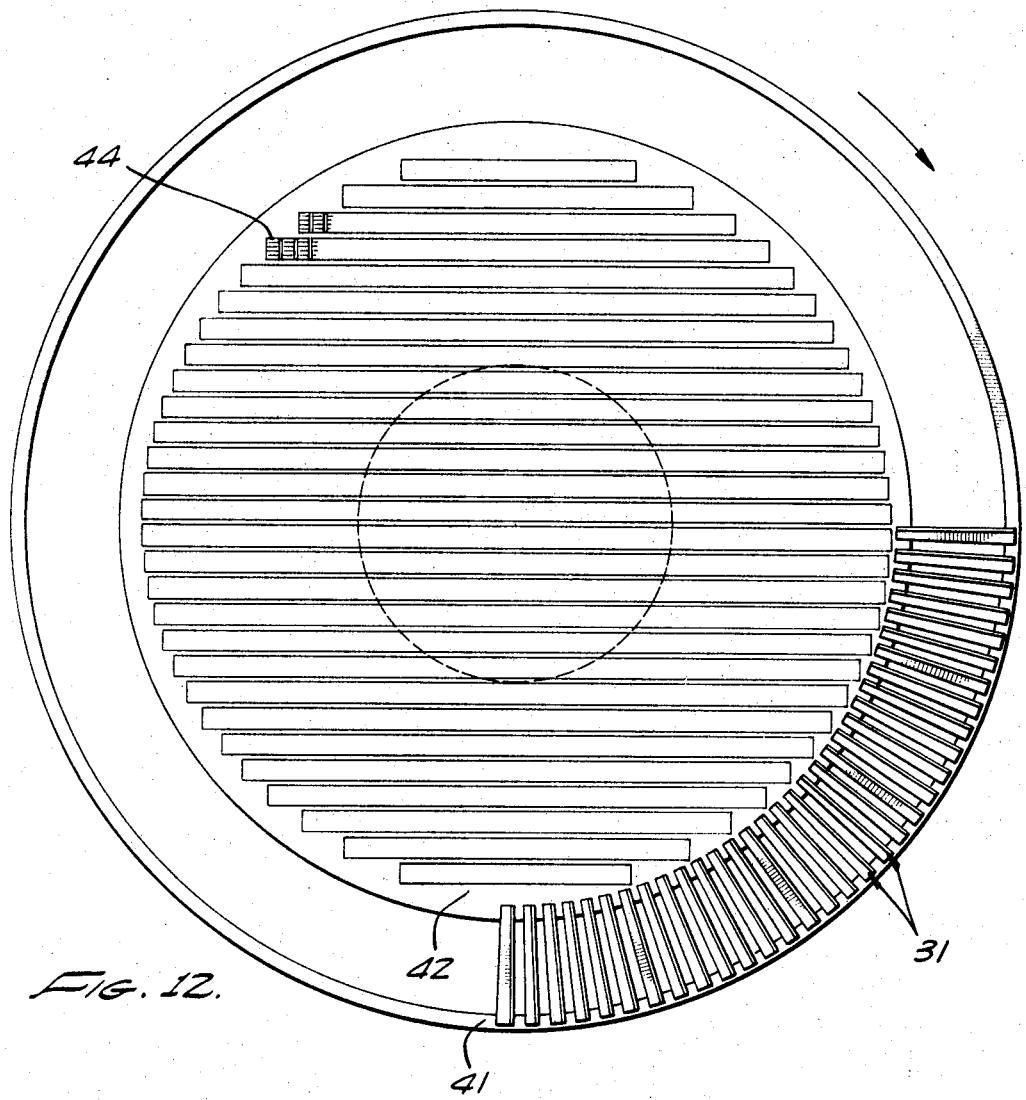

FIGURE 12 is a top or plan view of a solar-cell panel and an annular L-shaped mirror assembly mounted on a satellite, showing a different embodiment of the present invention.

Figure 13:
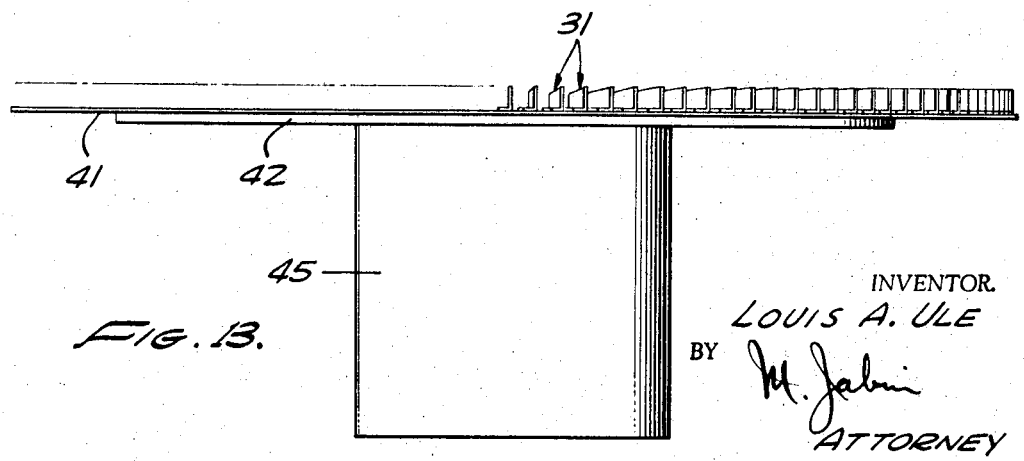

FIGURE 13 is a side view of the satellite assembly of FIGURE 12.

Figure 1:
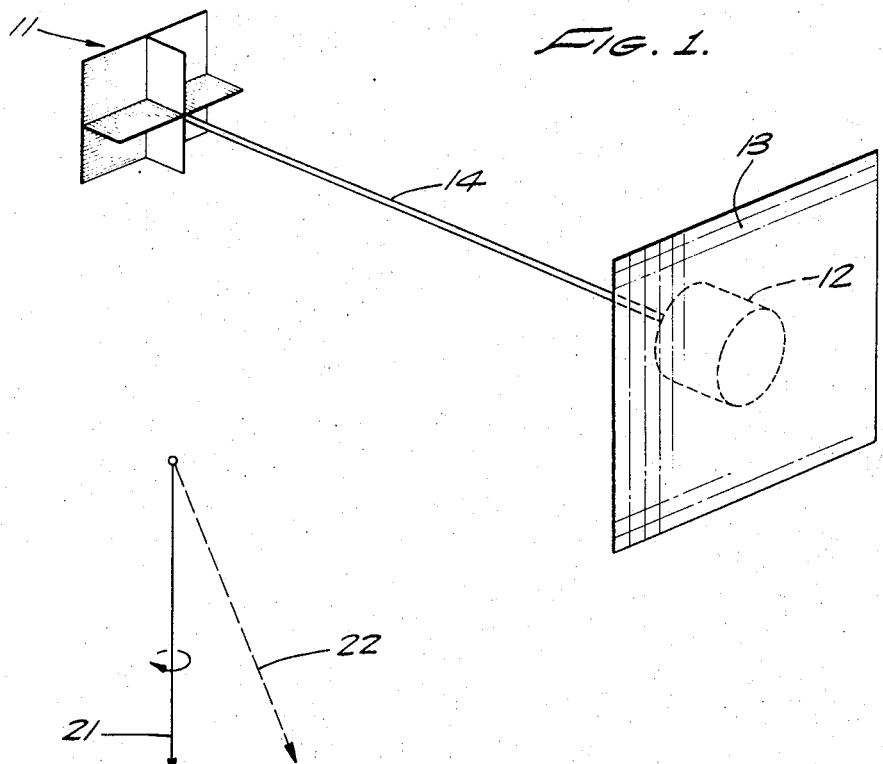
FIGURE 1 is a view of a heliotropic device according to one embodiment of the present invention.

Referring now to the drawings, FIGURE 1 shows corner reflector 11 for orienting non-spinning satellite 12 so as to face solar-cell panel 13 towards the sun. Reflector 11 is a highly reflecting optical corner reflector, such as a mirror, and is connected to satellite 12 by means of beryllium-copper tape spar 14, which can initially be rolled up, so as to appear as a metal measuring tape. Spar 14 must be sufficiently rigid to enable reflector 11 to impart a torque to satellite 12.

The behavior of the device is similar to that of a weather vane, the light pressure acting upon the corner reflector much as the dynamic pressure of wind. The force is computed in the same way:

$$F = pAC_d \tag{1}$$

where F is the force acting on the corner reflector; $p$ is the light pressure of sunlight; A is the projected area of the corner reflector; and $C_d$ is the optical "drag coefficient" of the corner reflector. The optical drag coefficient of an object can range from zero to two and may depend on the angle of incidence.

The device shown in FIGURE 1 is difficult to damp. Without damping the "weather vane" will oscillate. That is not its principal limitation, however, since even a spin as little as one revolution per year may cause the solar cell array to be continuously oriented away from the sun.

Since most satellites spin, either by design or in spite of it, a means for orienting a spinning device such as a solar collector towards the sun, using only the light pressure of the sun as the motive agent, will now be described. It will be shown that this mode of automatic orientation is highly feasible, compatible and desirable, and that although light pressure is a very weak force, it is adequate to turn a satellite of typical weight and size at the required rate.

Pressure is physically equivalent to energy density, the amount of energy per unit volume, whether one is talking about light, radio waves, magnetic fields, sound waves or any other form of propagated energy. The rate at which energy travels through space is the product of the energy per unit volume (or pressure) and the velocity of travel. Thus, joules per second per square meter = (joules per cubic meter) × (meters per second) (2)

A joule per second is one watt, hence Formula 2 can be written as watts per square meter = (pressure in newtons per square meter) × (meters per second) (3)

Equation 3 applies to all forms of energy propagation, sound waves, radio waves, light waves and sunlight. Since we are interested in the pressure produced by sunlight we may rewrite 3 as follows:

$$\text{light pressure} = \frac{(\text{watts per sq. meter})}{(\text{velocity of light})} \frac{(\text{newtons per})}{\text{square meter}} \tag{4}$$

A newton is a unit of force equivalent to about 3.5 ounces, but by definition equal to 100,000 dynes. Sunlight in space at one A.U. has an intensity of 1400 watts per square meter. The velocity of light is 300,000,000 meters per second. Substituting these values in 4 results in:

$$\text{sunlight pressure} = \frac{1400 \times 100,000}{300,000,000}$$

$$= .466 \text{ dynes per sq. meter} \quad (5)$$

It can be seen that the pressure is extremely small.

It is desired that the satellite be spinning with its spin axis directed to the sun and the solar panel so arranged that it faces the sun continuously. Since, however, a spinning body, in the absence of external forces, will maintain its direction in inertial space, i.e., relative to the "fixed" stars, and since the sun, because of the rotation of the earth (and therefore, the satellite) about it does not appear to be fixed in direction, but appears, rather, to rotate about the earth (and therefore, the satellite) once every year, it is necessary that the spin axis be caused to rotate at one revolution per year to follow the apparent course of the sun. The only way, short of rockets, to turn the spin axis of a spinning satellite relative to internal space (the "fixed stars") is by the application of an external torque. In the absence of external torques the spin axis will remain fixed. Furthermore, because of the "gyroscopic effect" the torque must be applied, not in the direction it is desired to turn the spin axis, but, rather, perpendicular to the desired direction. Thus, the weather-cocking corner reflector of FIGURE 1 cannot be used for a spinning satellite.

One of the laws of nature is the conservation of angular momentum, M.

$$M = I\omega \quad (6)$$

where I is the moment of inertia of a rigid body and $\omega$ is the spin rate of the body in radians per second. If the moment of inertia of a body is caused to change because of deformation, a new spin rate will arise such that the product of the moment of inertia and spin rate, known as the angular momentum, is the same as before. The moment of inertia of a body about an axis of spin is given by the volume integral $$I = \int \rho x^2 d\tau$$

where: $\rho$ is the local density of the body; $x$ is the distance of the volume element $d\tau$ from the presumed axis; and $d\tau$ is the differential element of volume.

Every rigid body has three principal axes of preferred rotation which are at right angles to each other. For a given angular momentum, rotation about the axis about which the moment of inertia is maximum requires the minimum kinetic energy. Rotation about this latter axis is therefore most stable and this axis is called the principal axis. The moment of inertia, I, considered here is that about the principal axis only.

The relationship between turning force (torque) and spin rate is given by $$T = I \frac{d\omega}{dt} \quad (7)$$

where T is the torque; I is the moment of inertia about the spin axis; and $d\omega/dt$ is the spin acceleration in radians per second per second.

Consistent units are assumed in Equations 6 and 7. Equation 7 can be written also as $$T = \frac{d}{dt}(I\omega) = \frac{dM}{dt} \quad (8)$$

or $$dM = Tdt \quad (9)$$

where the term $dM$ or $Tdt$, the product of torque times time in seconds, is called the angular impulse.

Since spin has both direction and magnitude it is a vector quantity and, conventionally, the direction of spin is represented by an arrow pointed in the direction that a right hand screw would travel if it represented a clockwise spinning body.

Figure 2:
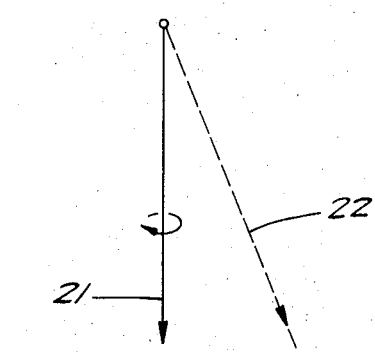
FIGURES 2 and 3 are vector diagrams involving the spin axis of a satellite.

FIGURE 2, which follows that convention, is a representation of the satellite's spin axis with respect to the direction of the sun, and follows the convention in representing the actual spin axis 21 and comparing it with the desired spin axis 22.

Figure 3:
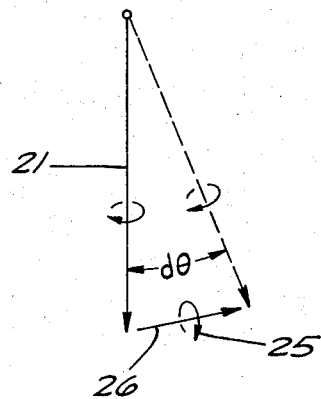

FIGURE 3 shows what spin must be imparted (i.e., angular momentum or the integral of torque times time, which are equivalent) to the spinning satellite to swing its spin axis to the desired direction.

If one contemplates the circular arrow 25 designating the direction of the added spin or angular impulse (or torque times time) it is seen that this arrow is perpendicular to the direction of the straight arrow 26 representing the magnitude of the swing of the spin axis 21. The angle $d\theta$, in radians, is equal to the ratio of the added angular momentum to the original angular momentum. The added angular momentum from 9 is $$dM = Tdt \quad (9)$$

The original angular momentum from 6 is $$M = I\omega \quad (6)$$

whence $$d\theta = \frac{Tdt}{I\omega} \quad (10)$$

or $$\frac{d\theta}{dt} = \frac{T}{I\omega} \quad (11)$$

The quantity $d\theta/dt$ is known as the precession rate and is the rate, in radians per second, that the spin axis turns (or precesses) when an external torque (at right angles to the resulting precession) is applied to the spinning body.

Since we are interested in getting an annual precession rate, that is, the spin axis is to make one revolution per year, it can easily be shown that the required value of $d\theta/dt$ is $$\frac{d\theta}{dt} = \frac{2\pi \text{ (radians)}}{60 \times 60 \times 24 \times 365.25 \text{ (seconds)}}$$

$$= 1.99 \times 10^{-7} \text{ radians/seconds} \quad (12)$$

The required torque is given by solving 11 and 12 for $$T = 1.99 \times 10^{-7} \times I\omega \quad (13)$$

Conceivably, the required torque may be extremely small. A typical satellite might have a moment of inertia of 10 kilogram meters-squared and a spin rate $\omega$ of one-tenth radian per second (about one r.p.m.). The torque required to precess it at an annual rate would then be about two ten-millionths (0.0000002) newton-meters or .02 dyne-meters. This value is compatible with the force available from solar light pressure Equation 5.

Equation 13 demonstrates that the torque required for orientation by precession of the spin axis is directly proportional to the spin rate. Thus, if the spin rate should exceed some value the required torque may exceed that available from light pressure and proper orientation would not occur. The design of devices for producing the required torque should not be such as to adversely affect the spin rate either by causing a reversal of spin by a "solar windmill" effect, in which case deorientation would ensue, or by producing excessive spin by a like windmill effect, in which case the orientation error would increase or orientation itself would cease. A desirable arrangement would be one where the initial spin rate is unaffected or where a solar windmill effect is used to cause a spin in the desired direction and which spin is prevented from exceeding a desired value by electrical eddy current damping in the earth's magnetic field.

Since light pressure can only push and cannot pull, it cannot produce a pure torque; however a variable force at different parts of a body can be produced such that in addition to a net push there may be unbalanced forces about the center of gravity (of a vehicle in free space) such that a torque or turning force results. One such instance of this was shown in FIGURE 1. The design of devices to produce torques to cause a spinning solar panel to precess toward the sun is slightly more involved.

Figure 4:
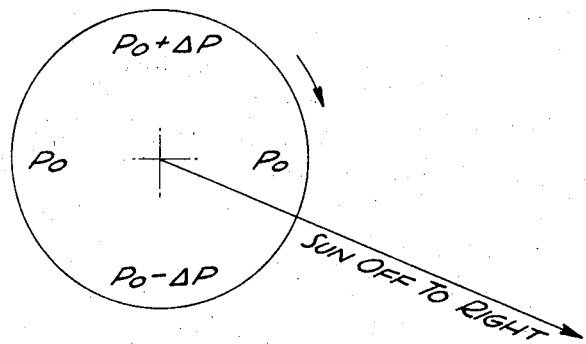
FIGURE 4 shows the forces required to precess a spinning solar panel toward the sun.

FIGURE 4 shows what is required for a spinning satellite. The forces are represented by a steady push force $p_0$ and deviations from it, $\Delta_p$, which produce the couple. These unbalanced increments must persist in the upper and lower sectors as shown, even as the satellite spins. Variable surface treatment or different optical "drag coefficients" for various sectors, therefore, would not achieve the desired effect. The "drag coefficient" must vary with the angle of incidence and should be very sensitive to it. Hence, an optical structure which has this property is required.

Mirrored surfaces at normal incidence have a drag coefficient of 2 (two), since they not only stop the light, but also reflect it. Thus, reflecting surfaces are preferred. Furthermore, a corner reflector (corner mirror) has the property that the light is not sent off at an angle, but, rather, is reflected back in the direction of incidence. Of the various reflecting structures that might be considered, the L-shaped mirror, which is a corner reflector, is as simple as any, and highly efficient. Such mirrors can be installed about the periphery of the solar panel such that, when the spin axis of the panel faces the sun, sunlight will strike them.

FIGURE 5 shows an L-shaped mirror 31, with sunlight, represented by arrows 32, striking mirror 31 at normal incidence. Equal forces are applied and no net torque is created.

FIGURES 6 and 7 show the amount of light-reflected back by the L-shaped mirror 31 for oblique angles of incidence. When the sun shines into the inside corner of the mirror, as shown in FIGURE 7, not only is more light intercepted than at normal incidence, as shown in FIGURE 5, but all of it is reflected back, enhancing the force produced by the light pressure. On the other hand, when the sun shines on the mirrored outside of the L-shaped mirror 31, as shown in FIGURE 6, not only is less light intercepted than for normal incidence, as shown in FIGURE 5, but the portion of the light which falls on the outside is reflected forward, thereby *cancelling* the normal force produced at incidence. Thus, the net normal force in FIGURE 6 is reduced by two mechanisms, namely, less intercepted light, and forward reflection.

FIGURE 8 shows L-shaped mirror 31 having a height (2W) twice the width (W) of its base 35. Other ratios are possible and perhaps more advantageous, but for the purpose of the following analysis, a ratio of two to one will be assumed for the L-shaped mirror.

At normal incidence, sunlight falls on the base 35 of the L-shaped mirror 31, and in FIGURE 8 would produce a force of $$F=(2)(.467)(W)(L) \text{ dynes} \quad (14)$$

according to Equation 1, where L represents the length of the mirror.

At an angle of incidence $i$, as shown in FIGURE 8, the normal component of the sun's light is reduced by the factor of $\cos i$. The intercepted area, however, as can be deduced from FIGURE 7, is increased to $$(W)(L)[\cos i + 2 \sin i] \quad (15)$$

so that the force on the mirror, by (1) is $$F=(2)(\cos \theta)(.467)(W)(L)[\cos i + 2 \sin i] \text{ dynes} \quad (16)$$

which will hold true until the corner begins to reflect light forward at $$\tan i = 1/2 = \frac{1}{\text{mirror ratio}}$$

For a negative value of $i$, part of the base is shadowed, and the light falling on the outside of the L-shaped mirror occasions no net force parallel to its surface. The effective intercepted area is then the same as before, noting that $i$ is negative, namely, $$(W)(L)[\cos i - 2 \sin(-i)] = WL[\cos i + 2 \sin i] \quad (15)$$

Now, if a pair of L-shaped mirrors are mounted on opposite sides of a circular structure as shown in FIGURE 9, and if the angle of the sun is turned an angle $i$ about a line joining the two mirrors, the difference in forces produced by light pressure on these two mirrors will be force difference = $2 (\cos i)(.467)(W)(L)$
$[\cos i - \cos i + 2 \sin i - (-2 \sin i)] = 8(.467)(W)(L)$
$\cos i \sin i$ dynes $\quad (16)$ The torque produced by sunlight acting on this pair of mirrors will be the force difference of Equation 16 times the radius $r$ (one half the distance between the opposite mirrors) or $$T = 8(.467)(W)(L)(r) \cos i \sin i \text{ dyne-meters} \quad (17)$$

where the radius $r$ is expressed in meters.

A corresponding analysis of the torque produced by light pressure force components acting on a pair of L-shaped mirrors in the plane of rotation shows that the net torque from light pressure which would cause a decrease in the spin rate of the pair of mirrors is negligible. Not all the optical devices that might be used to produce a precessing torque have this desirable property.

FIGURES 10 and 11 show a pair of plane mirrors 37 and 38 inclined at an angle $\phi$ with respect to the spin axis 39, like a pair of turbine blades. There is produced on the mirror 37, as shown in FIGURE 11, a net force perpendicular to the mirror surface and proportional to $2 \sin (\phi - i)$. The vector component of this net force parallel to the spin axis has a magnitude proportional to $$2 \sin (\phi - i) \cos \phi$$

and the precessing torque produced by a pair of such mirrors at a radius $r$ is proportional to $$2r \cos \phi \sin (\phi - i) - \sin (\phi + i) = 4r \cos^2 \phi \sin i$$

which is analogous to Equation (17).

The forces in the plane of spin cause a decrease in the spin rate and produce a despining torque similarly derived to be proportional to $$4r \cos^2 \phi \cos i$$

Eventually, this torque would reverse the direction of spin and cause the spin axis to precess away from the direction to the sun, represented by arrow 40.

FIGURE 12 shows an annular array of L-shaped mirrors 31 supported by outer rim 41 and panel 42, which also supports a plurality of solar-cell modules 44. FIGURE 13 is a side view showing satellite 45 with solar-cell panel 42, outer rim 41, and mirrors 31 mounted thereon. The heliotropic apparatus could also be a prism, an opaque structure, a translucent structure, or a thin film structure.

The torque produced by an annular array of L-shaped mirrors, (resembling a windmill in appearance, but not analogous in function to one) such as those shown in FIGURES 12 and 13 can be calculated as follows. There must be a space between adjacent mirrors sufficient in width to permit light to pass through when it is reflected from the outside of the L-shaped mirror. Thus, on an area basis the torque produced by such an array will be one-half that given by Equation 17. The incremental torque $dT$ for such a structure can then be written as $$dT = 4(.467)dA(r) \cos i \sin i \text{ dyne-meters} \quad (18)$$

where $dA$ is an element of area.

Equation 18 holds only for those areas of the structure which lie on the diameter which is perpendicular to the direction to the sun. For mirror elements which lie on a diameter at an angle $\theta$ from the above diameter the incremental torque is reduced by $\cos \theta$ to $$dT = 4(.467)dA(r) \cos i \sin i \cos \theta \text{ dyne-meters} \quad (19)$$

The torque available from an annular mirror (or fin) assembly such as is shown in FIGURES 12 and 13 can be computed by integration of 19 if the inner radius $r_i$ and the outer radius $r_o$ of the annulus are specified. The element of area may conveniently be taken as $$dA = r d\phi dr$$

whence $$T = \int_{-\pi/2}^{\pi/2} \int_{r_i}^{r_o} 4(.467) r^2 \cos i \sin i \cos \theta d\theta dr \quad (20)$$

which, when evaluated, yields $$T = 4(.467)(2)\left[\frac{r_o^3 - r_i^3}{3}\right] \cos i \sin i \text{ dyne-meters} \quad (21)$$

Since from Equation 13 and what follows, a torque of .02 dyne-meters is required (typically, with wide variation depending upon satellite size), this value may be used to compute from 21 a rough relationship between tracking error ($i$ in Equation 21) and annulus dimensions ($r_o$ and $r_i$). Rearranging Equation 21, $$2 \cos i = \sin i = \sin 2i = \frac{3T}{4(.467)[r_o^3 - r_i^3]} \quad (22)$$

which for $T = .02$ dyne-meters; $r_o = 1$ meter; $r_i = .75$ meter, results in $$\sin 2i = \frac{.06}{4(.467)[1 - .421875]} = .05556$$

whence $i = 1.59$ degrees.

This error can be reduced by a corresponding reduction in spin rate, which was assumed to be one r.p.m. in the example given, and a substantial reduction can be made by a moderate increase in outer radius. For the orientation of photovoltaic solar panels, tracking errors up to 10 degrees are entirely acceptable, as the loss in power at this point is only 1.5%.

It is to be understood that the heliotropic apparatus of the present invention can be used also to orient photoelectric energy converters and solar observatories, and for the orientation of solar concentrators such as thermoelectric converters, thermionic converters, heat engines, furnaces and boilers.

The heliotropic apparatus could be fixedly connected to the satellite body, or it could be fixedly connected to the panel to be oriented, which might be pivotally coupled to the satellite body.

In summary, the feasibility of using light pressure as an orienting force for satellite solar power arrays of all types has been demonstrated by a detailed physical analysis and by an example of a design based on a satellite size commonly employed. It is believed that the invention will have a considerable impact on the use of solar power, particularly photovoltaic solar cells in satellites and indirectly a corresponding impact on world communication systems which will use such satellites in profuse numbers and at great cost. By increasing the electrical power available to such satellites by an order of magnitude (four or five), enormous and economically significant cost savings will be effected.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

I claim:
1. Heliotropic apparatus for space vehicles of the type adapted to spin about a given axis, said apparatus comprising support means adapted for coupling to said vehicle, annular means coupled to said support means, the plane of said annular means being normal to said spin axis, a plurality of light reflectors having a base portion and a portion extending upwardly from said annular means, said base portion being mounted on said annular means, said upwardly extending portion having an inside and an outside surface, said inside surface of said upwardly extending portion lying substantially in a radial plane of said annular means, said base portion and said inside and outside surfaces of said upwardly extending portion being mirror-like, each of said reflector means being spaced circumferentially about said annular means and having the inside surfaces of each of said upwardly extending portions facing in the same rotational direction.

2. In a space vehicle of the type having a spin axis, heliotropic means for aligning the spin axis on a line with the sun, said means comprising a support means coupled to said space vehicle, said support means including an annulus situated in a plane normal to said spin axis, a plurality of light reflectors mounted upon said annulus, said light reflectors each being a corner reflector having an upper leg situated in a plane parallel to said spin axis and a base leg situated in the plane of said annulus, said reflectors being positioned radially about said annulus with each of said base legs extending in the same rotational direction.

3. In a space vehicle of the type having a spin axis, heliotropic means for aligning the spin axis on a line with the sun, said means exhibiting optical symmetry at points aligned with said spin axis and exhibiting optical asymmetry at all other points above the surface thereof, said means including a plurality of L-shaped mirrors having an upper leg and a base leg, said mirrors positioned as an annulus about said spin axis, the plane of said annulus being normal to said spin axis, the base leg of each of said L-shaped mirrors extending in the same rotational direction.

4. In a space vehicle of the type having a spin axis, heliotropic means for aligning the spin axis on a line with the sun, said means exhibiting optical symmetry at points aligned with said spin axis and exhibiting optical asymmetry at all other points above the surface thereof, said means including a plurality of L-shaped mirrors each having an upper leg and a base leg, said mirrors positioned as an annular about said spin axis, the plane of said annulus being normal to said spin axis, the base leg of each of said L-shaped mirrors extending in the same rotational direction, the upper leg of each of said L-shaped mirrors lying in a radial plane of said annular means, the upper leg being approximately twice as long as the base leg.

References Cited
UNITED STATES PATENTS

| | | | |
|---|---|---|---|
| 3,860 | 11/1875 | Crookes | 88—23 |
| 182,172 | 9/1876 | Crookes | 88—23 |
| 3,057,579 | 10/1962 | Cutler et al. | 244—1 |
| 3,116,035 | 12/1963 | Cutler | 244—1 |
| 3,145,948 | 8/1965 | Kershner. | |

(Other references on following page)

OTHER REFERENCES

Frye, W. E., "Stabilization and Attitude Control of Satellite Vehicles," ARS J., 29, No. 12, pp. 927–931 (1959).

Newton, R. R., "Stabilizing a Spherical Satellite by Radiation Pressure," A.R.S.J., 30 No. 12, pp. 1175–1177 (1960).

Roberson, R. E. and Farrior, J. S. Progress in Astronautics and Rocketry, N.Y., Academic Press, "Effects of Solar Radiation Pressure on Satellite Attitude Control," pp. 543–564 and "Generalized Two-Impulse Scheme for Reorienting a Spin Stabilized Vehicle," pp. 649–668, vol. 9, (Guidance and Control) 1962.

Sohn, R. L., "Attitude Stabilization by Means of Solar Radiation Pressure," ARS J. 29, No. 5, pp. 371–373 (1959).

JEWELL H. PEDERSEN, *Primary Examiner.*

W. L. SIKES, *Assistant Examiner.*